(12) United States Patent
Heitzler et al.

(10) Patent No.: US 8,258,658 B2
(45) Date of Patent: Sep. 4, 2012

(54) ELECTRIC MOTOR

(75) Inventors: Jean-Claude Heitzler, Horbourg-Wihr (FR); Christian Muller, Strasbourg (FR)

(73) Assignee: Cooltech Applications, Holtzheim (FR)

( * ) Notice: Subject to any disclaimer, the term of this patent is extended or adjusted under 35 U.S.C. 154(b) by 161 days.

(21) Appl. No.: 12/989,816

(22) PCT Filed: Apr. 24, 2009

(86) PCT No.: PCT/FR2009/000485
§ 371 (c)(1),
(2), (4) Date: Oct. 27, 2010

(87) PCT Pub. No.: WO2009/133323
PCT Pub. Date: Nov. 5, 2009

(65) Prior Publication Data
US 2011/0043058 A1      Feb. 24, 2011

(30) Foreign Application Priority Data
Apr. 28, 2008   (FR) ...................................... 08 02368

(51) Int. Cl.
*H02K 9/00* (2006.01)
(52) U.S. Cl. .......................................... 310/52; 310/64
(58) Field of Classification Search .................... 310/52, 310/54, 58, 64
See application file for complete search history.

(56) References Cited

U.S. PATENT DOCUMENTS

| 4,727,721 A * | 3/1988 | Peschka et al. .................. 62/3.1 |
| 6,935,121 B2 * | 8/2005 | Fang et al. ........................ 62/3.1 |
| 2005/0120720 A1 | 6/2005 | Fang et al. |

FOREIGN PATENT DOCUMENTS

| DE | 41 28 362 A1 | 3/1992 |
| WO | 03/016794 A1 | 2/2003 |

OTHER PUBLICATIONS

Thorsten K. et al.: "Inverse Magnetocaloric Effect in Ferromagnetic Ni—Mn_Sn Alloys", Natural Minerals, vol. 4, May 15, 2005, pp. 450-454.

* cited by examiner

*Primary Examiner* — Nguyen N Hanh
(74) *Attorney, Agent, or Firm* — Davis & Bujold, P.L.L.C.

(57) ABSTRACT

The electric motor (10) of the rotary type comprises a circular peripheral frame (11) inside of which a stator (12) is mounted, and the stator (12) comprises electrical coils (13) having each an armature (13a) and a winding of conductive wires (13b). The electric motor (10) comprises equipment (14) which is movable in relation to the stator, this mobile equipment is in this case a rotor (15) arranged coaxially in relation to the stator (12). The rotor (15) comprises a set of electric coils (16) which are electromagnets. The armatures (13a) of the electric coils (13) and those of the electric coils (16) comprise advantageously at least one element out of reverse magnetocaloric material arranged so as to contribute to cooling of the electric motor.

7 Claims, 5 Drawing Sheets

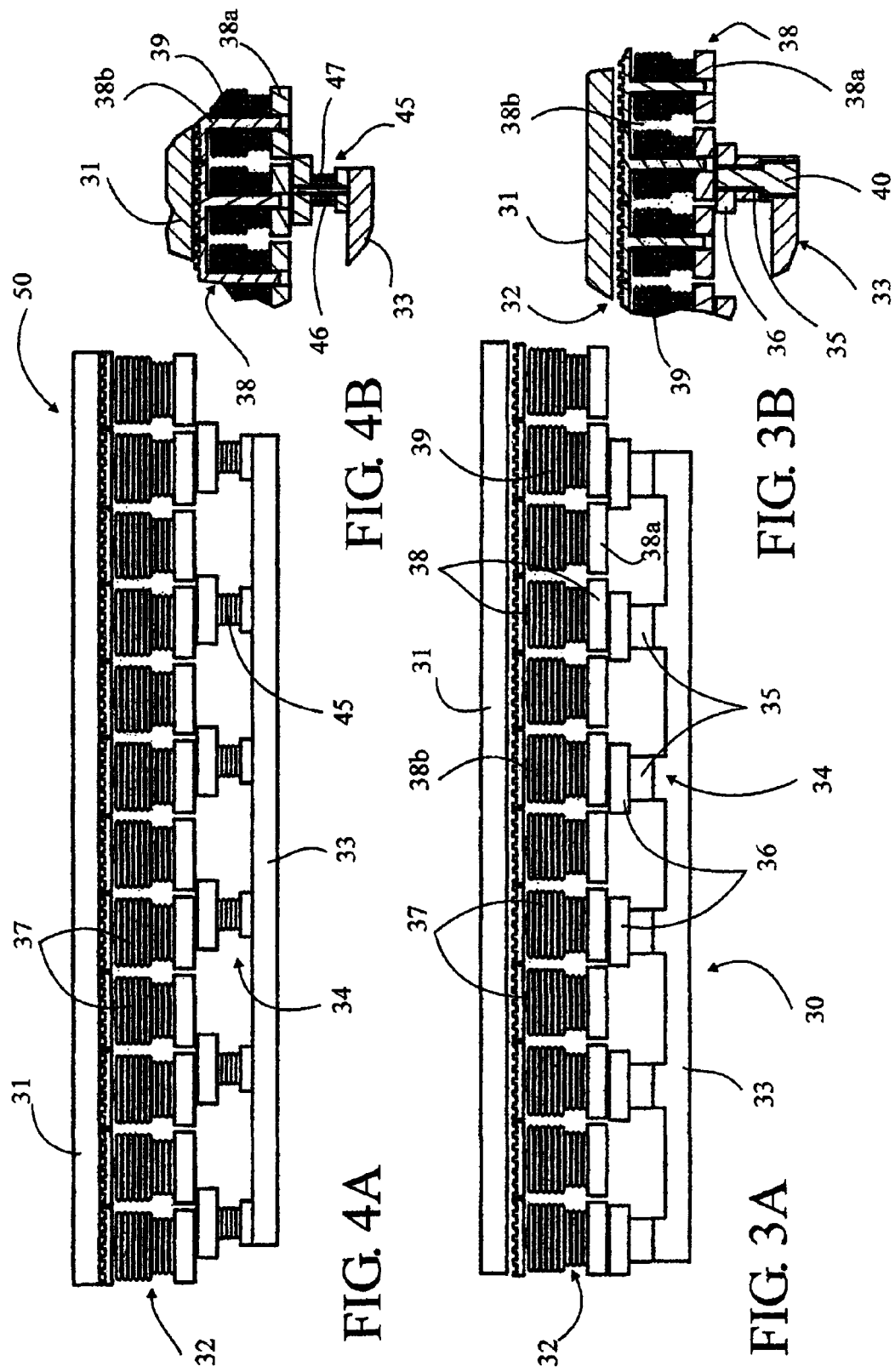

ELECTRIC MOTOR

This application is a National Stage completion of PCT/FR2009/000485 filed Apr. 24, 2009, which claims priority from French patent application Ser. No. 08/02368 filed Apr. 28, 2008.

FIELD OF THE INVENTION

The present invention relates to an electric motor comprising a fixed stator and equipment which is mobile in relation to the stator, the stator comprising at least two electric coils mounted on a fixed armature and the mobile equipment supporting a magnetic arrangement, the electric coils being energized electrically so as to generate a magnetic field, and the magnetic arrangement being arranged so as to create magnetic field lines that cooperate with the magnetic field to bring about the movement of the mobile equipment in relation to the stator.

BACKGROUND OF THE INVENTION

When electrical motors are subject to constraints or to speed variations, they undergo heating, which must be controlled, so that their output remains as close as possible to an optimum efficiency. To that purpose, today's electric motors comprise generally a fan with rotary blades, which is mounted on the shaft of the motor and which communicates with the outside through a grid provided in the frame of this motor. In case of very large plants, more sophisticated air or water cooling systems may be used.

Nevertheless, all present solutions have the disadvantage that they cannot collect the calories in the heart of the motor and that they only ensure a more or less peripheral cooling of the frame. Therefore, the efficiency of the cooling remains low.

The patent application US 2005/120720, which describes a magnetocaloric generator intended for generating thermal power, is known. The thermal generator described in this application however does not relate to a motor and does not touch on the problem of the cooling of a motor.

SUMMARY OF THE INVENTION

The present invention proposes to improve this efficiency by replacing or completing the classic cooling means of the electric motors with a device that starts operating selectively when its temperature reaches a given level and that allows collecting the calories to be eliminated right in the heart of this motor.

This goal is achieved thanks to the device of the invention, in which the armature of the stator comprises at least one element out of reverse magnetocaloric material arranged so as to contribute to the cooling of the electric motor.

According to a first variant in which the motor is of the rotary type, comprising a peripheral frame, a stator housed in this frame and the mobile equipment being made of a rotor mounted coaxially inside of the stator, the rotor comprising a set of electric coils mounted on an armature, the armature can advantageously comprise at least one element out of reverse magnetocaloric material.

According to another embodiment of a rotary motor, in which the rotor comprises a set of permanent magnets, the permanent magnets are advantageously separated by elements containing at least one reverse magnetocaloric material.

Preferentially, the elements, which separate the permanent magnets, are hollow parts arranged in order to allow the passage of a cooling fluid.

According to another embodiment, the motor is a linear motor and comprises an elongated frame, a linear stator housed in this frame, the mobile equipment is made of a carriage that is mobile in translation, mounted parallel to the stator and supports the magnetic arrangement, the magnetic arrangement of the mobile carriage comprising a set of permanent magnets, the magnets are advantageously mounted on cores containing at least one reverse magnetocaloric material.

According to a second variant, the magnetic arrangement of the mobile carriage comprises a set of electromagnets and the electromagnets comprise electric coils mounted on armatures, the armatures comprising advantageously at least one element out of reverse magnetocaloric material.

Furthermore, the electric motor according to the invention can also comprise at least one element out of a magnetocaloric material capable of preheating the motor in its starting phase.

BRIEF DESCRIPTION OF THE DRAWINGS

The present invention and its advantages will be better revealed in the following description of several embodiments given as non limiting examples, in reference to the drawings in appendix, in which:

FIG. 3A is an elevation view of a first embodiment of a linear motor according to the invention, FIG. 3B is a partial section view illustrating main components of the linear motor of FIG. 3A, FIG. 4A is an elevation view of a second embodiment of a linear motor according to the invention, and FIG. 4B is a partial section view illustrating main components of the linear motor of FIG. 4A.

DETAILED DESCRIPTION OF THE PREFERRED EMBODIMENTS

Figure 1B:
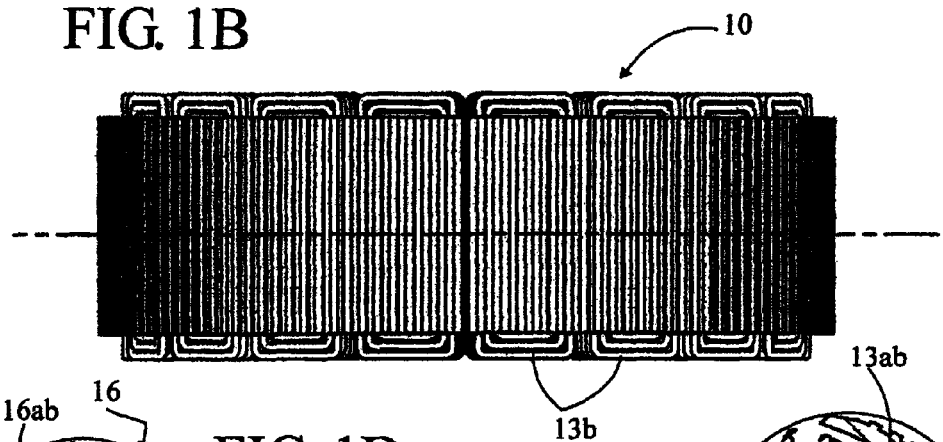
FIG. 1B is an elevation view of the electric motor of FIG. 1A, without its frame.
Figure 1D:
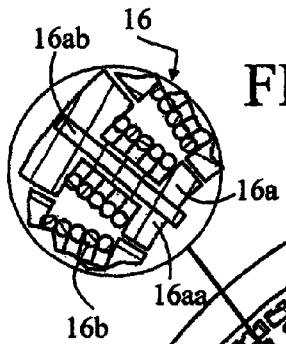
FIG. 1D is an enlarged section view of a part of the rotor of the electric motor of FIG. 1A.
Figure 1E:
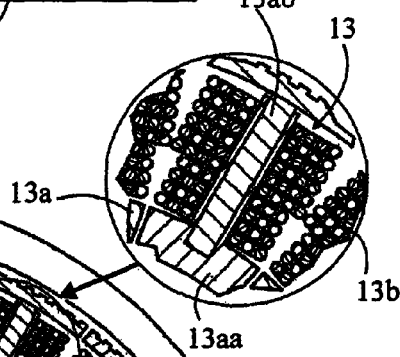
FIG. 1E is an enlarged section view of another part of the stator of the electric motor of FIG. 1A.
Figure 1A:
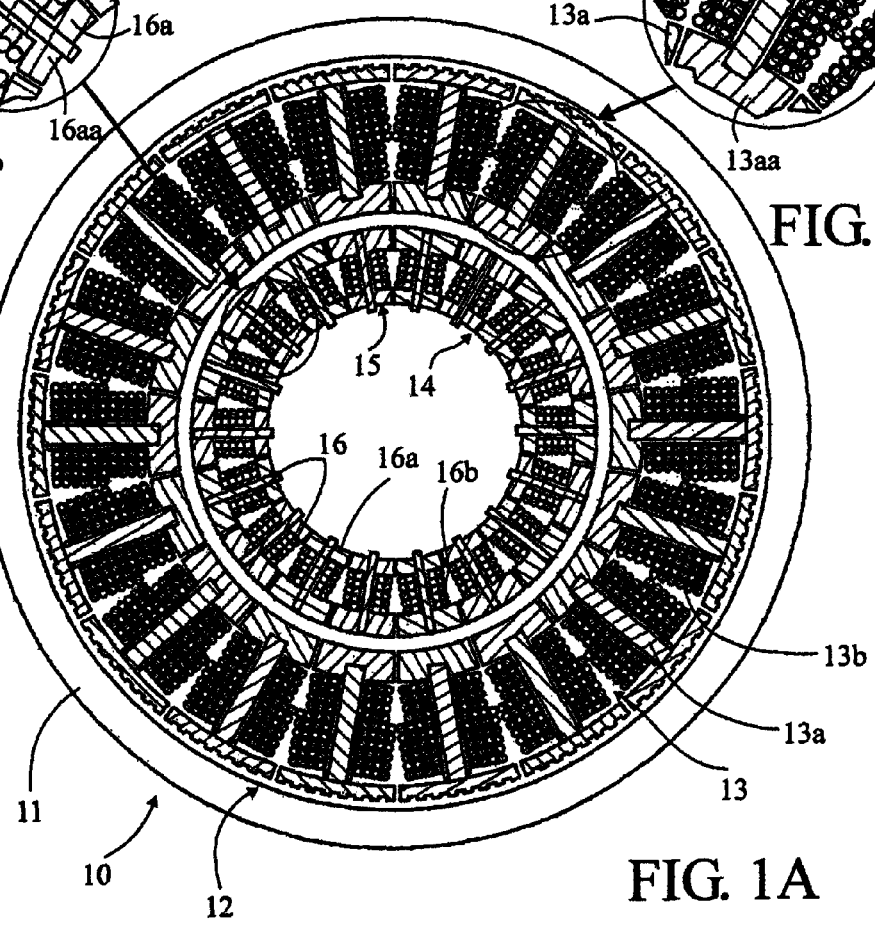
FIG. 1A is a section view of a first embodiment of the electric motor of the invention, of the rotary type.
Figure 1C:
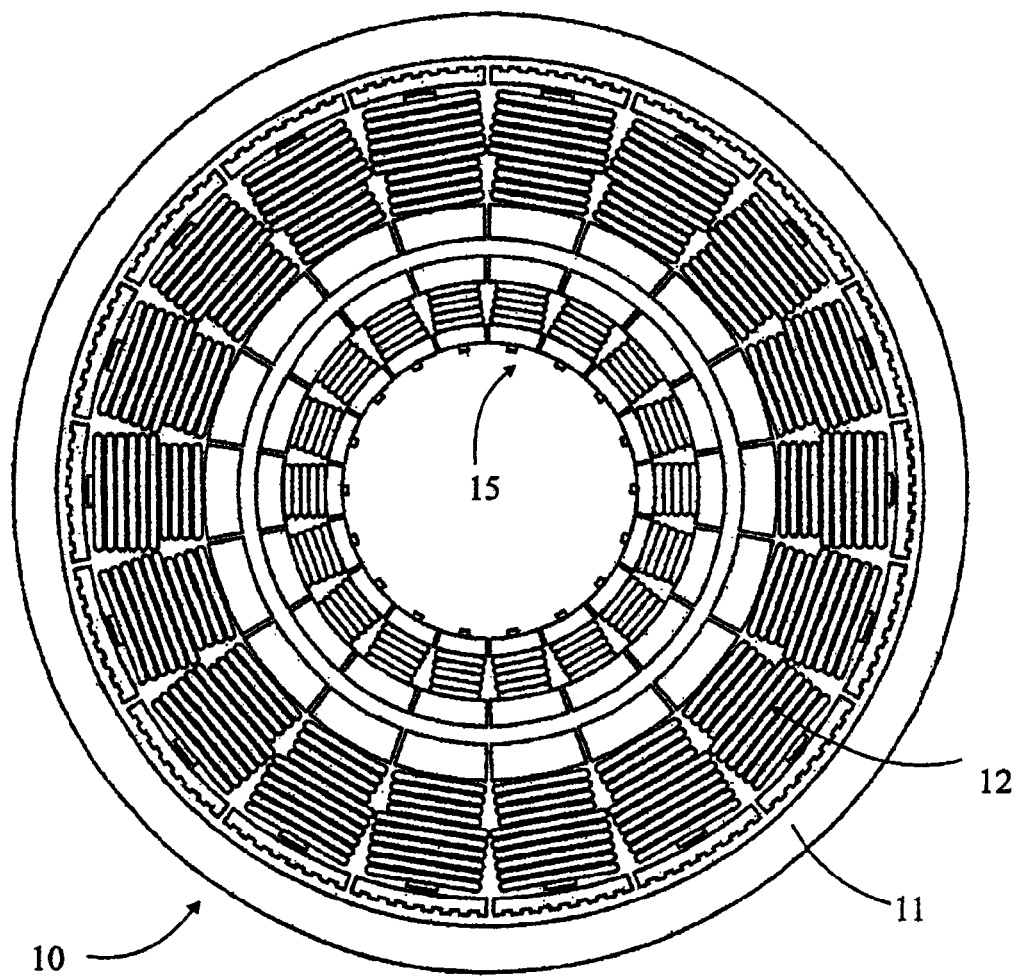
FIG. 1C is an outside view of the electric motor of FIG. 1A.

In reference to FIGS. 1A, 1B and 1C, the electric motor 10 represented, of the rotary type, comprises a circular peripheral frame 11 inside of which a stator 12 is mounted, comprising a certain number of electric coils 13, each comprising an armature 13a and a winding of conducting wires 13b mounted on the armature 13a. The electric motor 10 comprises moreover equipment 14, which is mobile in relation to the stator, this mobile equipment is in this case a rotor 15 arranged coaxially in relation to the stator 12. In the example shown, the rotor 15 comprises a set of electric coils 16 comprising each an armature 16a and a winding of conducting wires 16*b*. The electric windings 16 are electromagnets, which are mounted on a supporting structure (not shown) of the rotor 15.

The armature 13*a* of the electric coils 13 is made of a base part 13*aa* having the shape of a linear segment or of a circular sector and of a leg 13*ab* perpendicular in relation to the base part 13*aa* (see FIG. 1E). At least the leg 13*ab* of the armature 13*a* comprises at least one so-called reverse magnetocaloric material, whose well known effect is to warm up or cool down, respectively, as it enters an area subject to a magnetic field, to a given temperature called an active temperature close to the Curie point, for the concerned magnetocaloric material. The base part 13*aa* may also comprise one or several magnetocaloric materials having the same effect. These elements, which are arranged in the heart of the electric motor, in the area close to the conducting wire windings 13*b* of the electric coils 13 allow collecting calories and evacuating them, maintaining the temperature of the motor at an optimum value. This cooling means replaces or completes the known air ventilation or liquid circuit cooling means of some electric motors. It has the advantage of acting within the immediate proximity to the heating source, i.e. the windings of the coils which heat up due to the Joule effect when an electric current passes through them, especially when the call for electric current becomes stronger because of an acceleration of the motor, or when it is subject to constraints.

One will note that the magnetocaloric effect only starts close to a given temperature called Curie temperature, which is linked to the nature of the magnetocaloric material. The so-called classical magnetocaloric materials heat up near instantly as they enter a magnetic field. The so-called reverse magnetocaloric materials have the particularity to cool down near instantly as they enter a magnetic field. In the present application, one will use preferably reverse magnetocaloric materials so as to generate "negative" calories, commonly called frigories. Their action will only start at a certain predetermined temperature, and they will tend to maintain the motor in a fixed temperature range in which its efficiency is optimal.

The armatures 16*a* of the electric coils 16 each comprise a base part 16*aa* having the shape of a linear segment or of a circular sector and a leg 16*ab*, perpendicular in relation to the base part 16*aa* (see FIG. 1D). The base parts 16*aa* and/or the perpendicular legs 16*ab* may comprise one or several reverse magnetocaloric materials so as to contribute to the cooling of the rotor 15 of the electric motor 10.

The frame 11 of the motor 10 is preferably designed so as to increase the heat exchange possibilities with the environment and to improve the stability of the temperature of the motor.

Figure 2B:
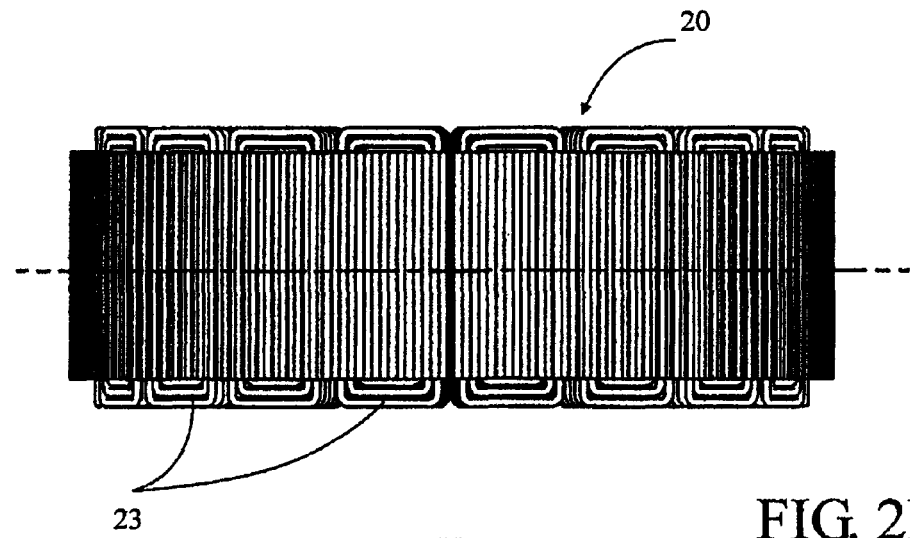
FIG. 2B is an elevation view of the electric motor of FIG. 2A.
Figure 2A:
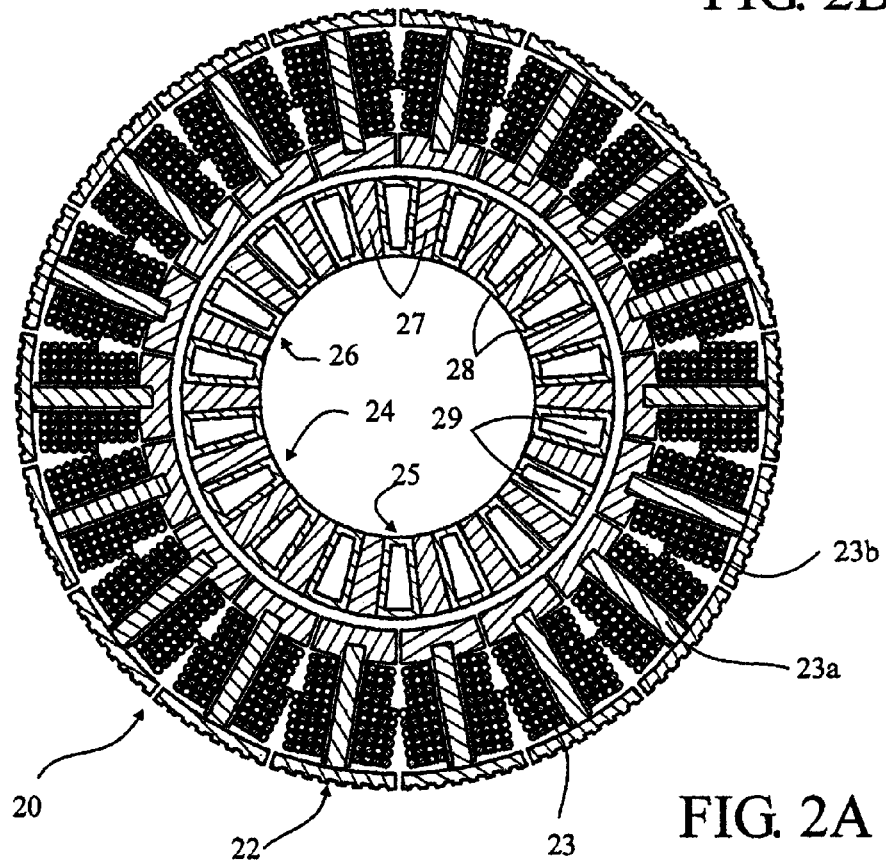
FIG. 2A is a section view of a second embodiment of the electric motor of the invention, without its peripheral frame.
Figure 2C:
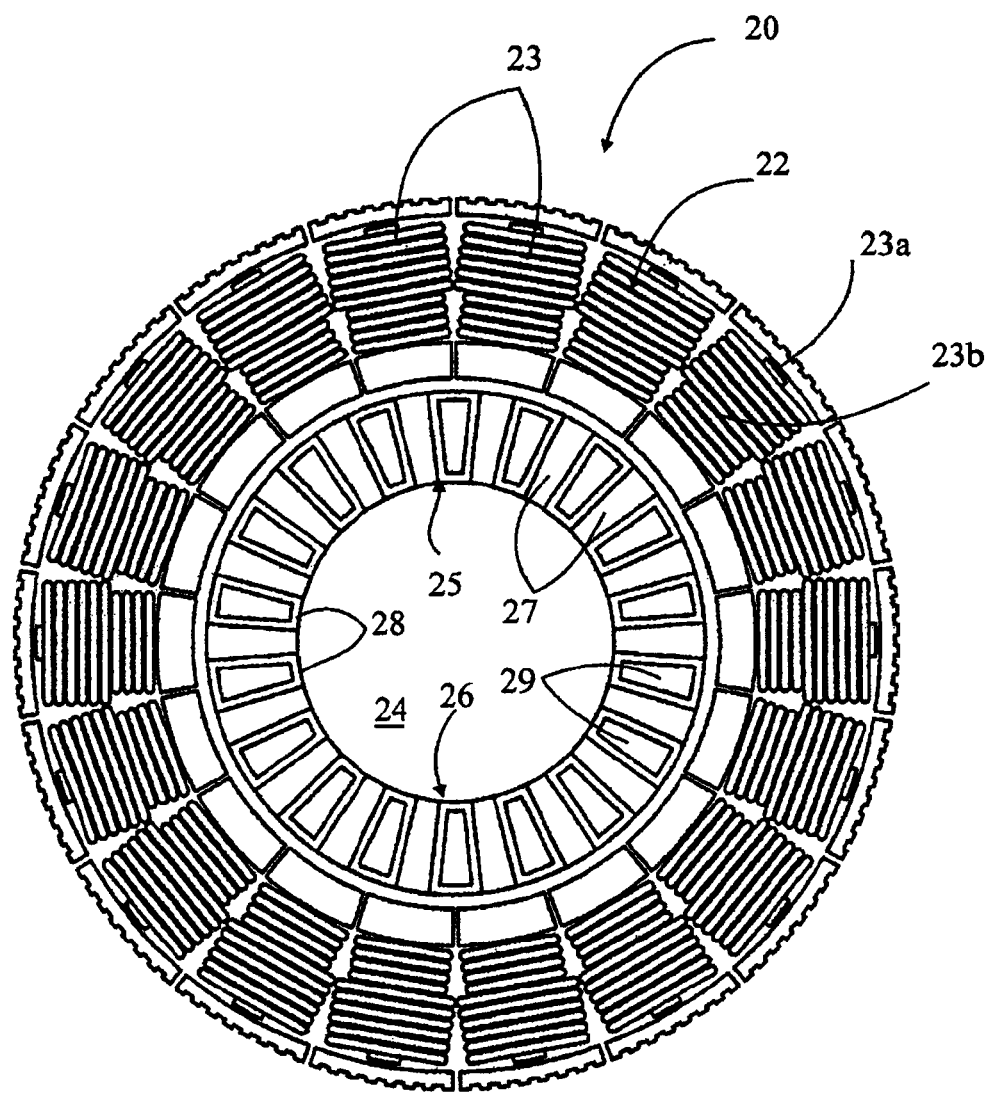
FIG. 2C is an outside view of the electric motor of FIGS. 2A and 2B.

In reference to FIGS. 2A, 2B and 2C, the electric motor 20 represented, of the rotary type, comprises, as above, a circular peripheral frame (not shown) inside of which a stator 22 is mounted, which comprises a certain number of electric coils 23 each comprising an armature 23*a* and a winding of conducting wires 23*b*, mounted on the armature 23*a*. The electric motor 20 comprises moreover equipment 24, which is mobile in relation to the stator 22, this mobile equipment is in this case a rotor 25 arranged coaxially in relation to the stator 22. In the example shown, the rotor 25 comprises a magnetic arrangement 26 comprising a set of permanent magnets 27 separated by magnetocaloric elements 28 each comprising a central cavity 29 intended for possible passage of a liquid or gaseous cooling fluid.

The various components of the stator 22 and of the rotor 25 have the same functions as those of the corresponding components of the rotary electric motor 10. As above, the function of the magnetocaloric elements is to regulate the temperature of the motor by avoiding overheating.

The FIGS. 3A and 3B correspond to an embodiment of an electric motor 30 of the linear type. The motor 30 comprises an elongated frame 31, a fixed linear stator 32 and a carriage 33, which is mobile alternately in relation to the fixed linear stator 32 and carries a magnetic arrangement 34, made in this case of a series of permanent magnets 35, each being associated with a magnetically permeable element 36. The fixed linear stator 32 is made of a set of electric coils 37 with parallel axes and perpendicular to the direction of movement of the carriage 33. Each of the electric coils 37 comprises an armature 38 and a winding of conductive wire 39. The armature 38 comprises, as above, a base part 38*a* having the shape of a linear segment and a leg 38*b* perpendicular in relation to the base part 38*a* (see FIG. 3B). The base parts 38*a* and/or the perpendicular legs 38*b* may comprise one or several reverse magnetocaloric materials so as to contribute to the cooling of the stator 32 of the electric motor 30.

As FIG. 3B shows more in detail, the mobile carriage 33 that carries the permanent magnets 35 is equipped with a set of cores 40 on which the permanent magnets 35 are mounted coaxially and made of a reverse magnetocaloric material that can be identical or not with that of the armatures 38.

The variant of the linear motor 50 represented on FIGS. 4A and 4B differs from that of FIG. 3 in that the permanent magnets 35 of the mobile carriage 33 are replaced with electromagnets 45 having an armature or core 46 surrounded with a coil 47 and made of a reverse magnetocaloric material. The other components are identical with those of the previous variant.

Even though this is not represented in the attached figures, the motor 10, 20, 30, 50 according to the invention may also comprise at least one element made of magnetocaloric material, possibly mounted on the stator, in the proximity or not to the elements out of reverse magnetocaloric material. The integration of such a magnetocaloric element allows carrying out a pre-heating of the motor when it starts. To that purpose, the active temperature range or operating range of the element made of magnetocaloric material is chosen so that the maximum temperature is close or equal to the optimum temperature of the motor. When this temperature is reached, the element out of magnetocaloric material will be inactive and will have no more magnetocaloric effect under the influence of a magnetic field.

Thanks to the invention, it is possible to achieve a motor 10, 20, 30, 50 that comprises an integrated pre-heating means in the form of at least one element out of magnetocaloric material and/or an integrated cooling means in the form of at least one element out of reverse magnetocaloric material.

Possibilities for Industrial Application

The present invention is not limited to the examples of embodiment described but extends to any obvious modification and variation for a person skilled in the art without departing from the scope of protection, as defined by the annexed claims. The number of magnets that make up the magnetic arrangement, together with their shape and positioning, may be modified depending on the objectives being sought in terms of efficiency, size, speed of rotation of the rotor, etc. The number of electric coils may also vary depending on the objectives to be achieved. The nature of the materials, especially of the reverse magnetocaloric materials, and that of the other components such as the frame of the device may be modified according to the requirements.

The invention claimed is:

1. An electric motor (10, 20, 30, 50) comprising:
   a fixed stator (12, 22, 32) and mobile equipment (14, 24, 33) which is movable relative to the fixed stator (12, 22, 32),
   the fixed stator (12, 22, 32) comprising at least two electric coils (13, 23, 37) mounted on a fixed armature (13a, 23a, 38) and the mobile equipment supporting a magnetic arrangement;
   the electric coils being energized electrically so as to generate a magnetic field, and the magnetic arrangement being arranged so as to create magnetic field lines that cooperate with the magnetic field to bring about the movement of the mobile equipment relative to the fixed stator (12, 22, 32); and
   the armature (13a, 23a, 38) of the stator (12, 22, 32) comprises at least one element out of reverse magnetocaloric material arranged so as to contribute to cooling the electric motor.

2. The electric motor according to claim 1, wherein the electric motor is a rotary motor type which comprises a peripheral frame (11), the fixed stator (12) housed in the frame and the mobile equipment being made of a rotor (15) mounted coaxially inside of the fixed stator (12), the rotor (15) comprises a set of electric coils (16) mounted on an armature (16a), and the armature (16a) comprises at least one element out of reverse magnetocaloric material.

3. The electric motor according to claim 1, wherein the electric motor is a rotary motor type which comprises a peripheral frame, the fixed stator (22) housed in the frame and the mobile equipment is made of a rotor (25) mounted coaxially inside of the stator, the rotor (25) comprises a set of permanent magnets (27), and the permanent magnets are separated by elements (28) comprising at least one reverse magnetocaloric material.

4. The electric motor according to claim 3, wherein the magnetocaloric elements (28), which separate the permanent magnets (27), are hollow parts arranged so as to allow the passage of a cooling fluid.

5. The electric motor according to claim 1, wherein the electric motor is a linear motor type which comprises an elongated frame, a linear stator (32) housed in the frame, the mobile equipment is made of a carriage mobile in translation (33) mounted parallel to the stator and supporting the magnetic arrangement (34), the magnetic arrangement (34) of the mobile carriage (33) comprises a set of permanent magnets (35), and the permanent magnets (35) are mounted on cores (40) containing at least one reverse magnetocaloric material.

6. The electric motor according to claim 1, wherein the electric motor is a linear motor type which comprises an elongated frame, a linear stator (32) housed in the frame, the mobile equipment is made of a carriage mobile in translation (33) mounted parallel to the stator and supporting the magnetic arrangement (34), the magnetic arrangement (34) of the mobile carriage (33) comprises a set of electromagnets (45) comprising electric coils (47) mounted on armatures (46), and the armatures (46) comprise at least one element out of reverse magnetocaloric material.

7. The electric motor according to claim 1, further comprising at least one element out of magnetocaloric material capable of preheating the motor during a starting phase.

* * * * *